(12) United States Patent
Hamilton et al.

(10) Patent No.: US 6,521,131 B1
(45) Date of Patent: Feb. 18, 2003

(54) COMBINED OXIDATION AND CHELATING ADSORPTION SYSTEM FOR REMOVAL OF MERCURY FROM WATER

(75) Inventors: Richard A. Hamilton, Beverly, MA (US); Scott P. Fulton, Waltham, MA (US); Ted M. Shields, Waltham, MA (US)

(73) Assignee: SolmeteX, Inc., MA (US)

( * ) Notice: Subject to any disclaimer, the term of this patent is extended or adjusted under 35 U.S.C. 154(b) by 0 days.

(21) Appl. No.: 09/353,775

(22) Filed: Jul. 15, 1999

Related U.S. Application Data

(63) Continuation-in-part of application No. 08/991,609, filed on Dec. 16, 1997, now abandoned.
(60) Provisional application No. 60/032,879, filed on Dec. 16, 1996.

(51) Int. Cl.[7] .................................. C02F 1/28; C02F 9/00
(52) U.S. Cl. ..................... 210/662; 210/668; 210/669; 210/688; 210/914
(58) Field of Search ..................... 210/662, 668, 210/679, 688, 758, 759, 760, 914, 669

(56) References Cited

U.S. PATENT DOCUMENTS

| | | | |
|---|---|---|---|
| 3,502,434 A | 3/1970 | MacMillan | 23/184 |
| 3,847,841 A | 11/1974 | Motani et al. | 260/2.2 R |
| 3,849,533 A | 11/1974 | Hetz | 423/99 |
| 4,028,236 A | * 6/1977 | Townsend et al. | 210/914 |
| 4,108,769 A | 8/1978 | Krieg et al. | 210/50 |
| 4,133,755 A | 1/1979 | Tarao et al. | 210/38 |
| 4,151,077 A | 4/1979 | Nogueira et al. | 210/21 |
| 4,167,481 A | 9/1979 | Cremers et al. | 210/36 |
| 4,230,486 A | 10/1980 | Capuano et al. | 75/81 |
| 4,578,195 A | 3/1986 | Moore et al. | 210/679 |
| 4,752,397 A | 6/1988 | Sood | 210/662 |
| 4,753,298 A | 6/1988 | Holbein et al. | 210/679 |
| 5,068,095 A | 11/1991 | Nigro et al. | 423/122 |
| 5,271,760 A | 12/1993 | Markovs et al. | 75/670 |
| 5,322,628 A | 6/1994 | Yan | 210/673 |
| 5,492,627 A | 2/1996 | Hagen et al. | 210/651 |
| 5,564,105 A | 10/1996 | Alvino et al. | 588/20 |

FOREIGN PATENT DOCUMENTS

DE          0 319 740 A1    6/1989

* cited by examiner

*Primary Examiner*—Ivars Cintins
(74) *Attorney, Agent, or Firm*—Wood, Herron & Evans, L.L.P.

(57) ABSTRACT

The disclosed invention relates to a method of disposing of mercury-containing wastewater containing mercury-complexing materials, comprising the steps of treating wastewater containing mercury ions with a strong oxidizing agent in a reaction chamber to produce pretreated wastewater by removing an effluent stream of pretreated wastewater from the reaction chamber; and passing the effluent stream of pretreated wastewater through a column packed with a mercury-selective adsorbent material to produce an effluent stream of wastewater having a reduced mercury content. The adsorbent material is a porous resin having immobilized mercury-selective chelating groups bound thereto. A particularly preferred adsorbent material is a crosslinked styrene-divinylbenzene copolymer having immobilized dithiocarbamate groups bound thereto.

35 Claims, 1 Drawing Sheet

COMBINED OXIDATION AND CHELATING ADSORPTION SYSTEM FOR REMOVAL OF MERCURY FROM WATER

The present application is a Continuation-In-Part of U.S. patent application Ser. No. 08/991,609 filed Dec. 16, 1997 (abandoned) which claims the benefit of United States Provisional Patent Application Serial No. 60/032,879 filed Dec. 16, 1996.

BACKGROUND OF THE INVENTION

1. Field of the Invention

This invention is a method to reduce levels of mercury in process water and wastewater to very low concentrations.

2. Description of the Prior Art

Many industrial processes require water with very low concentrations of metals. In addition, federal guidelines mandate that mercury-containing wastewater to be discharged from hospitals, clinical and industrial laboratories, groundwater redemption facilities, or manufacturing plants into the environment must contain very low levels of mercury contaminants. For wastewater, required discharge concentrations are frequently in the range of 1–10 micrograms Hg/L, and are lower in some places. It is also believed that this process will be of use in removing mercury from polluted groundwaters.

Mercury has a strong tendency to form both ionic and covalent complexes with a wide variety of materials that may be present in water, including particulate or colloidal material, organic molecules, and inorganic ions. Mercury is particularly susceptible to the formation of chelate complexes with polydentate organic ligands. Mercuric ion can also undergo spontaneous reduction to the metallic form. Mercury in these complexed or metallic forms can be highly resistant to removal by conventional treatment means.

Conventional treatment methods for the removal of mercury include amalgam formation with silver or gold, adsorption on activated carbon, adsorption on a cation exchange material, precipitation with sulfide ion, or adsorption on resins having immobilized chelating groups.

As described by Capuano et al. in U.S. Pat. No. 4,230,486, formation of a mercury amalgam is carried out by contacting a mercury-containing solution with particles of metallic silver. The mercury dissolves in the silver to form an amalgam and a purified liquid. The amalgam can then be heated to vaporize the mercury, allowing both the silver and the mercury to be recovered. However, organic mercury compounds do not readily react with silver, as noted by Yan in U.S. Pat. No. 5,322,628. Yan further reports that gold will readily remove organic mercury species; however, the amount of gold required to successfully reduce mercury levels in industrial effluents renders such a process commercially unfeasible.

Adsorption of mercury on activated carbon is often used to remove mercury from liquids. However, the mechanism of carbon adsorption of mercury is not well understood, and the technology is often unable to meet low discharge limits. The adsorbent occasionally releases large quantities of adsorbed mercury at unpredictable times. This can cause dangerous levels of mercury to be released into the environment accidentally.

Treatment of wastewater containing mercury with a cation exchange material is known to reduce mercury concentration. However, ion exchange of mercury-bearing wastewater is unable to reduce the mercury concentration to the required levels without the use of extremely large adsorbent columns, due to the relatively low equilibrium binding constant between the mercury ions and the ion-exchange adsorbent.

Precipitation of mercury with insoluble hydroxides or sulfides with alkali, lime, or sulfide ion is also known. However, such techniques can be difficult to use on a small scale, and are unable to meet discharge limits without complex and expensive microfiltration systems. Also, industrial effluents often contain organic chemicals which form soluble complexes with mercury ions. These complexes are often highly resistant to precipitation.

Resins or inorganic matrices having immobilized chelating groups have been developed for removal of mercury from wastewater. Many of these materials contain immobilized hydroxyl groups. These resins or matrices can reduce levels of mercury in wastewater to the desired discharge levels with ionic mercury solutions. For example, Holbein et al., in U.S. Pat. No. 4,752,398, when wastewater is allowed to flow through a silica gel carrier having immobilized cysteine groups bound thereto at flow rates of 30–95 ml/hr, the mercury concentration in the wastewater may be reduced from 14 ppm to less than 0.03 ppm. Similarly, exposure of mercury-containing solutions to vinyl polymers having immobilized thiosemicarbazido groups has been found to reduce mercury concentrations from 200 ppm to under 0.01 ppm (Motani et al., U.S. Pat. No. 3,847,841).

However, some difficulties have been experienced with these chelating materials. First, sulfhydryl-based resins are extremely susceptible to oxidation. Also, these resins are unable to reduce mercury levels to the desired levels with wastewater feed streams that contain high levels of complexed mercury. Finally, even when these resins are effective, the kinetics of mercury adsorption onto the resin are very slow.

Attempts have been made to overcome some of these problems. Cremers et al., in U.S. Pat. No. 4,167,481, disclose that mercury levels in a mercury-containing solution containing an anionic organic ligand such as EDTA or citrate can be reduced in a two-step process. First, the solution is treated with a polyamine which tightly complexes the mercury ions, displacing any anionic ligands present to form more stable cationic complexes. The solution is then treated with an ion exchange material such as an aluminosilicate which adsorbs polyamine complexes of mercury. However, this has the disadvantage that it depends on the binding constants between polyamines and mercury; if a chelating group which binds as strongly or more strongly to mercury than polyamines is present, the system will fail to sufficiently reduce mercury levels.

Another method of removing metals from an aqueous solution containing organic metal-complexing materials by treating the solutions with an oxidant has been proposed by Alvino et al. (U.S. Pat. No. 5,564,105). A solution containing organic complexes of ferrous cations may be treated with an oxidizing agent which oxidizes the organic complexing agent to water and carbon dioxide, and causes the contaminating ferrous material to separate from the solution as a precipitate. The oxidation step takes from 20 to 50 minutes, and is carried out at a temperature of between 140° F. and 212° F. Almost as an afterthought, Alvino et al. suggest that it may be possible to treat mercury-containing solutions using this process as well. However, the oxidation takes place under elevated temperatures, and it requires a substantial energy input to maintain these temperatures. A process that allows one to oxidize a solution containing organic complexes of metal cations to produce free metal cations at ambient temperatures without increasing reaction times would be greatly desired.

SUMMARY OF THE INVENTION

It is an object of the invention to develop a method of dramatically reducing mercury ion concentrations in process waters and wastewaters containing mercury. This method should be effective at removing elemental mercury, ionic mercury, covalent mercury compounds, or chelate mercury complexes.

More particularly, the invention relates to a method of removing mercury from wastewater, comprising the steps of treating wastewater containing mercury-containing contaminants, such as ionic mercury, elemental mercury, covalent mercury compounds, and mercury complexes of organic and/or inorganic ligands, with an oxidizing agent to produce pretreated wastewater, and passing the pretreated wastewater through an adsorbent material which adsorbs or binds free mercury ions. The oxidizing agent oxidizes elemental mercury to ionic mercury, and releases complexed mercury ions into a non-complexed ionic form. These ions may then be more readily adsorbed by the adsorbent material, which is preferably a resin or inorganic matrix which has mercury-selective chelating groups attached thereto. These and other methods will apparent in light of the following figures and detailed description.

DETAILED DESCRIPTION OF THE INVENTION

The current invention combines a water pretreatment technique which releases complexed mercury into a free ionic form with an adsorbent resin that adsorbs the ionic mercury very strongly. The treatment may be applied to contaminated water which is to be purified for use in an industrial process, to wastewater which is to be discharged into the environment, or to contaminated groundwaters. The treatment may also be used to purify wastewater from an industrial process so that it may be recycled and returned to the process. The pretreatment involves treatment of the water with a sufficient quantity of an oxidizing agent to release the mercury. The oxidizing agent must be sufficiently strong to oxidize elemental mercury to ionic mercury, and release complexed mercury ions into solution as a non-complexed ionic form. Hypochlorite (chlorine bleach) is the preferred oxidizing agent, although the choice of oxidizing agent is not limited thereto. If desired, other oxidizing agents such as hydrogen peroxide, Fenton's reagent, hypobromite, iodinates, chlorine dioxide, and ozone may be used in place of hypochlorite. Preferably, the pretreatment is carried out at a temperature between 60° F. and 90° F. in an oxidation chamber. More preferably, the reaction temperature is between 65° F. and 80° F. (i.e., room temperature). The oxidation reaction is allowed to proceed for a period of time of from 5 minutes to 60 minutes, preferably for a period of time of from 5 minutes to 30 minutes, more preferably for a period of time of from 5 minutes to 15 minutes. In contrast to the process of Alvino, heating of the wastewater-oxidant solution is neither essential, nor desirable. It is worthy of note that the reduction in the reaction temperature is achieved without increasing the time required for the oxidation reaction. In fact, it is frequently possible to carry out a successful oxidation reaction in 5 minutes, which is substantially less time than contemplated by Alvino. Further, the metal ions released from the complexes do not precipitate from solution as in the method of Alvino.

Figure 1:
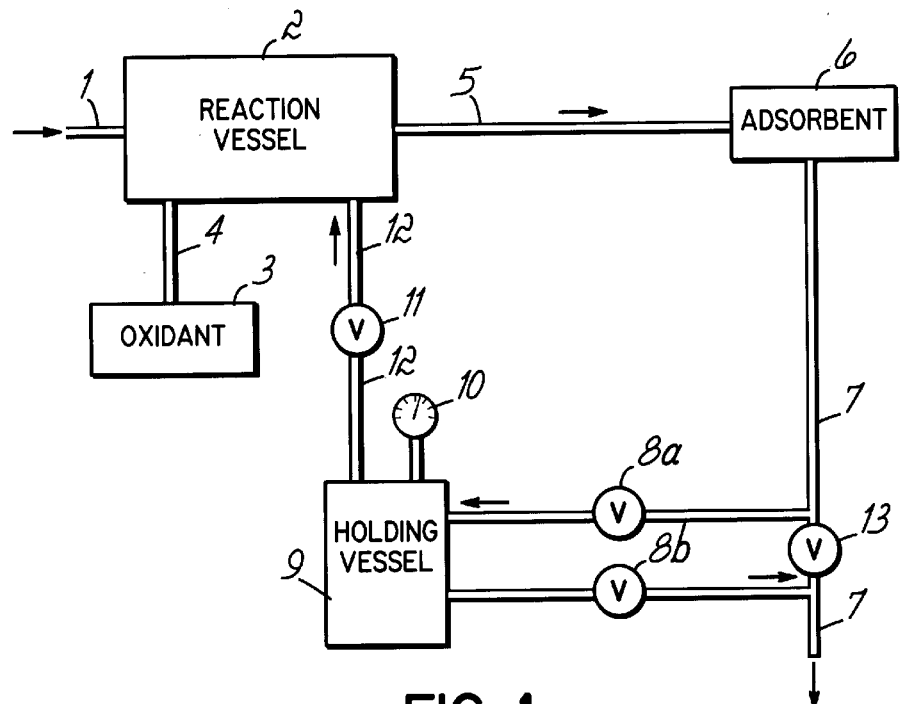
FIG. 1 illustrates a two-stage wastewater treatment system according to the invention, featuring an initial wastewater oxidation stage, followed by treatment with a mercury-selective adsorbent material.

FIG. 1 shows the basic process in more detail. A wastewater stream containing mercury contaminants, including mercury complexes of organic ligands, flows through conduit 1 into the reaction vessel 2. A supply of oxidizing agent flows from the oxidant storage vessel 3 into the reaction vessel 2 through conduit 4. The oxidizing agent is allowed to react with the wastewater until substantially all complexed mercury ions are released as free ions. When the reaction is complete, an effluent liquid flows from vessel 2 through conduit 5 to container 6.

Container 6 may take the form of a vessel containing adsorbent material having mercury-selective chelating groups bound thereto. These chelating groups bind to non-complexed mercury ions, removing them from solution. The mercury-selective chelating groups should have a sufficiently large equilibrium binding constant for non-complexed mercury cations to achieve substantially complete binding of the mercury cations to the adsorbent material and reduce the concentration of non-complexed mercury cations to below 1 microgram/liter. The pretreated wastewater typically remains in the vessel in contact with the adsorbent material for a period of time of between 5 minutes and 30 minutes, although greater or lesser contact times may be used if desired.

Container 6 may also take the form of a column packed with a defined volume of an adsorbent material having mercury-selective chelating groups bound thereto. The effluent liquid flows through the adsorbent material having mercury-selective chelating groups bound thereto in column 6, and leaves the column through conduit 7. In most cases, exposure to the adsorbent material reduces the mercury levels in the liquid to a point where it is safe to use the water in an industrial process, or, in the case of wastewater, to discharge the liquid to the environment. The pretreated wastewater is allowed to flow through the column packed with adsorbent material, typically at a rate of from 0.2 to 5.0 bed-volumes/min, where 1 bed-volume is defined as an amount of liquid having a volume equal to the defined volume of adsorbent material, although faster or slower flow rates may be used if desired. The optimal flow rate is a function of the concentration of mercury-selective chelating groups per unit volume of adsorbent material; as the concentration of chelating groups increases, the rate at which wastewater passes through the column may be increased.

In many cases, it is advisable to determine the mercury concentration of the process water or wastewater before using it in a process or discharging it. If mercury levels are too high, the water may then be subjected to further treatment. To do this, the treated wastewater may be diverted from conduit 7 through valve 8a and into a holding vessel 9 to be tested. A device 10 for sensing mercury levels is attached to vessel 9. If sensor 10 detects that mercury levels in the water in vessel 9 are acceptably low, the wastewater flows from vessel 9 into conduit 7 through valve 8b, and is then discharged. If mercury levels are too high, valve 8b is closed and a second valve 11 is opened. The wastewater in vessel 9 then is returned to either vessel 2 (as shown in FIG. 1) or to conduit 1 for further treatment by way of valve 11 and conduit 12. During this procedure, valve 13 is closed to prevent untested water from leaving the system through conduit 7. If testing is deemed unnecessary, valves 8a, 8b, and 11 are closed, and valve 13 is opened.

The endpoint of the pretreatment reaction carried out in vessel 2 can be determined automatically by measuring the residual level of the oxidizing agent in the treated wastewater. For example, the mercury-containing liquid may be titrated with series of aliquots of a solution of oxidant. After each addition of oxidant, the oxidant concentration in the wastewater is monitored. If the oxidant concentration declines below a desired concentration of unreacted oxidant (the residual level of oxidant), a further aliquot of oxidant is added. When the concentration of unreacted oxidizing agent fails to decline below the desired residual level after addition of an aliquot of oxidant, it may be assumed that the oxidation reaction has been completed, and that all mercury ions have been liberated from organic complexing agents. Alternatively, if the concentration of mercury in the wastewater is known, the experimenter may calculate the amount of oxidant required to react with the mercury in a given volume of wastewater. An amount of oxidant solution containing the calculated amount of oxidant, plus an amount of excess oxidant equal to the desired residual level of oxidant, is then added to the wastewater in a single step and allowed to react. The excess oxidant helps to drive the oxidant reaction to completion. When the oxidant concentration in the wastewater declines to the desired residual level, it is assumed that the oxidation reaction is completed.

In the case of hypochlorite oxidation, the residual hypochlorite level is measured. A reaction time in the range of at least 15–30 minutes is usually preferred for hypochlorite oxidation, although reaction times of under five minutes or over an hour may be used in some cases. A residual hypochlorite level of at least 1 mg/L is needed in most cases to reach the endpoint of the reaction. Higher residual levels are possible, but increasing the residual level to too high a level can eventually cause degradation of the adsorbent material when the pretreated wastewater is passed to column 6.

The adsorbent material in column 6 must bind ionic mercury sufficiently well to reduce mercury concentrations in discharged wastewater to very low levels over a wide range of broad pH range (at least over a range of pH 4 to pH 10 in common waste streams). Additionally, the adsorbent material must be able to resist attack by the residual amounts of hypochlorite or other oxidizing agents in the wastewater entering the column from vessel 2. Preferably, the adsorbent material is a porous resin having immobilized mercury-selective chelating groups bound thereto.

Preferred porous resins are styrene resins, acrylic resins, and polysaccharide resins which have been crosslinked with a polyfunctional crosslinking agent. For example, a styrene resin may be crosslinked with divinylbenzene. The mercury-selective chelating groups should have a large equilibrium binding constant for non-complexed mercury ions, and should also be resistant to oxidation by the oxidizing agent supplied to reaction vessel 2. Preferably, the mercury-selective chelating groups are dithiocarbamate groups, which are resistant to oxidation and have a large binding constant for mercury ions. Other useful mercury-selective chelating groups are thiol groups, thiophene groups, thioether groups, thiazole groups, thalocyanine groups, thiourenium groups, amino groups, polyethylene imine groups, hydrazido groups, N-thiocarbamoyl-polyalkylene polyamino groups, derivatives thereof, and mixtures thereof. The most preferred adsorbent material is a macroporous polyacrylic based resin having mercury-selective chelating groups bound thereto. Another useful material is a crosslinked styrene-divinylbenzene copolymer having immobilized dithiocarbamate groups bound thereto.

Alternatively, the adsorbent material may be an inorganic matrix having immobilized mercury-selective chelating groups bound thereto. Particularly useful inorganic materials are silica, alumina, titania, zirconia, clays, and zeolites. Any of the previously-listed chelating groups may be bound to the inorganic matrix. Particulate silica, alumina, or zirconia base materials having immobilized dithiocarbamate groups bound thereto are particularly preferred inorganic adsorbents.

This system has the advantage that it may be applied in existing wastewater treatment facilities with minimal retrofitting. It is in many cases merely necessary to insert a reaction vessel 2 having an associated oxidant supply vessel 3 into a wastewater conduit leading to an adsorbent column 6.

Figure 2:
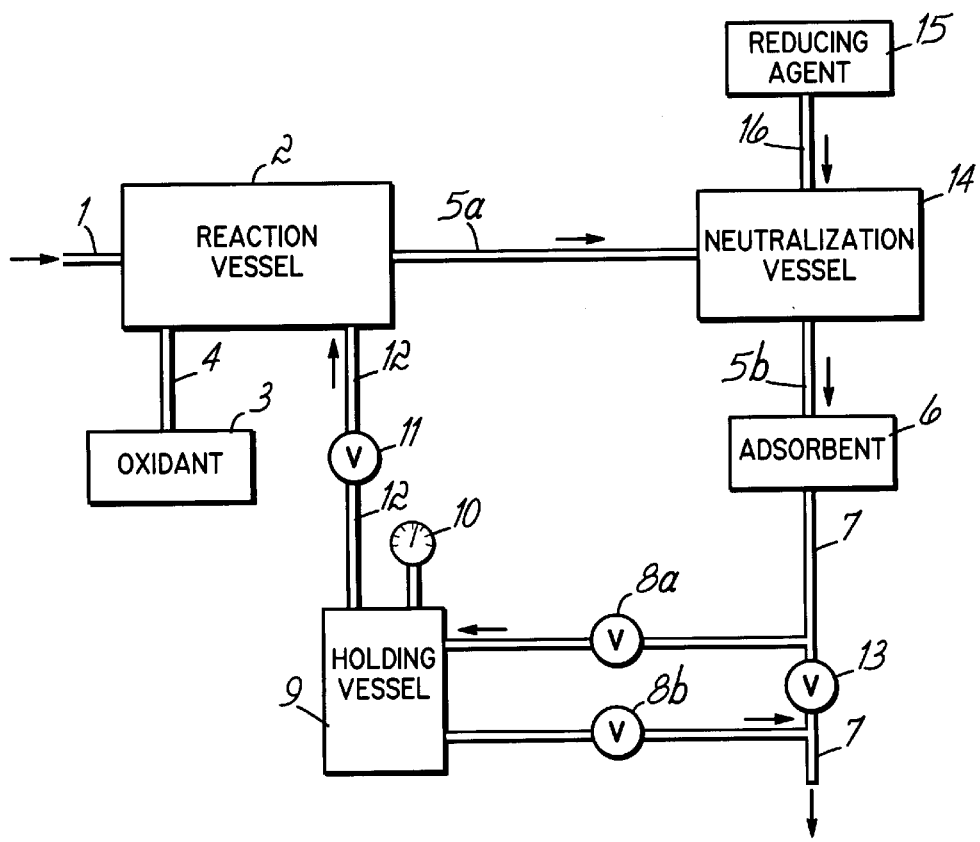
FIG. 2 illustrates a three-stage wastewater treatment system according to the invention, featuring treatment of mercury-containing wastewater with excess oxidant, reduction of unreacted oxidant, and treatment of wastewater with a mercury-selective adsorbent material.

An alternative method of practicing this invention is illustrated in FIG. 2. A wastewater stream containing mercury contaminants, including mercury complexes of organic ligands, flows into the reaction vessel 2. A large excess of oxidizing agent flows from the oxidant storage vessel 3 into the reaction vessel 2 through conduit 4, and is allowed to react with the wastewater until substantially all complexed mercury ions are released as free ions. When the reaction is complete, an effluent liquid containing free mercury ions and unreacted oxidizing agent flows from vessel 2 through conduit 5a to a neutralization vessel 14. A mild reducing agent is fed from reductant storage vessel 15 through conduit 16 into vessel 14. The amount of reducing agent which is used should be sufficient to neutralize substantially all of the unreacted oxidizing agent in the effluent liquid. Once the neutralization reaction is complete, the effluent liquid flows to the adsorbent column 6 through conduit 5b. From this point on, the wastewater treatment method proceeds exactly as described above. The primary advantage of this procedure is that the reduction of residual oxidant prior to introduction of the effluent liquid to column 6 eliminates the need to monitor residual oxidant levels. Also, use of a large excess of reagent in the oxidation stage can cause the oxidation reaction to occur more quickly. However, this method does consume more reagent per unit volume of wastewater and hence is more suited for small-scale applications.

This system, combining an oxidation pretreatment and reaction with an adsorbent resin, is able to meet governmental requirements for mercury concentrations in wastewaters which are resistant to treatment with adsorbents alone. The system is simple and inexpensive to implement, and can be fully automated in operation using relatively simple hardware.

In order to illustrate the present invention further, the following examples are provided. However, the scope of the present invention should not be construed as being limited by the examples.

EXAMPLES

In examples 1–5, various mercury-containing wastewaters are obtained, and each sample is divided into two portions. Unless otherwise specified, one portion of each sample is run through a column packed with 5 ml of a mercury-selective adsorbent resin. The resin used in these experiments was a macroporous polyacrylic resin having immobilized dithiocarbamate groups bound thereto. The wastewaters were run through the adsorbent resin at a flow rate of 5 ml/min (1 bed volume/min). This resin was used to treat a series of mercury-containing water samples. The second portion of each sample is subjected to a pretreatment with hypochlorite, and then is run through the column of adsorbent resin. For each example, multiple trials were performed.

Example 1

A solution of mercuric chloride in distilled water was prepared. The concentration of the solution was 725 micrograms Hg/L (plus or minus 5 micrograms/L). When this solution was allowed to run through a column of polyacrylate adsorbent resin without any pretreatment, the mercury concentration was reproducibly reduced to less than 1 microgram/L, as shown in Table 1.

TABLE 1

Removal of Mercury From Wastewater Using Hypochlorite Oxidation and Treatment with Adsorbent Resin.

| | | MERCURY CONCENTRATION (micrograms/L) | | |
|---|---|---|---|---|
| EXAMPLE* | TRIAL | Untreated Wastewater | Wastewater After Adsorption | Wastewater After Oxidation & Adsorption |
| 1 | 1 | 725 | 0.6 | 0.2 |
| " | 2 | 723 | 0.5 | 0.3 |
| " | 3 | 730 | 0.7 | 0.6 |
| " | 4 | 727 | 0.4 | 0.5 |
| " | 5 | 725 | 0.5 | 0.4 |
| 2 | 1 | 685 | 6.3 | 0.5 |
| " | 2 | 671 | 6.1 | 0.6 |
| " | 3 | 682 | 6.2 | 0.3 |
| " | 4 | 684 | 6.5 | 0.7 |
| " | 5 | 681 | 6.3 | 0.4 |
| 3 | 1 | 55 | 3.4 | 0.8 |
| " | 2 | 61 | 3.8 | 0.6 |
| " | 3 | 58 | 3.1 | 0.7 |
| " | 4 | 59 | 3.5 | 0.5 |
| " | 5 | 56 | 3.4 | 0.7 |
| 4 | 1 | 7.4 | 2.5 | 0.81 |
| " | 2 | 2.3 | 1.07 | 0.79 |
| " | 3 | 4.1 | 1.1 | 0.82 |

*Wastewater in Example 1 is mercuric chloride in distilled water.
Wastewater in Example 2 is wastewater from a medical incinerator.
Wastewater in Example 3 is clinical analyzer wastewater from a clinical laboratory.
Wastewater in Example 4 is wastewater from a clinical laboratory, containing waste from a variety of sources.

If the mercuric chloride solution is oxidized with hypochlorite prior to treatment with adsorbent resin, little or no significant difference in the final mercury concentration is seen. This indicates that treatment with mercury-selective adsorbent resin without an oxidative pretreatment effectively removes mercury from an aqueous solution of mercuric chloride containing no significant mercury-complexing organic contaminants.

Example 2

A series of samples of medical incinerator wastewaters were obtained. The mercury concentrations in these wastewaters ranged from roughly 670 to 685 micrograms Hg/L (Table 1). When a portion of each waste sample was allowed to run through a column of polyacrylate adsorbent resin without oxidative pretreatment, the mercury concentration was reproducibly reduced to between 6 and 6.5 micrograms/ L. When a second portion of each wastewater sample was subjected to a hypochlorite oxidation pretreatment and then exposed to the adsorbent resin column, the column effluent had a final mercury concentration of between 0.3 and 0.7 micrograms/L. Thus, oxidative pretreatment of incinerator wastewaters reduces the final mercury concentration by an order of magnitude. The final mercury concentration meets the governmental standards for wastewater to be discharged into the environment.

Example 3

A series of samples of clinical analyzer wastewaters from clinical laboratories were obtained. The mercury concentrations in these wastewaters ranged from roughly 55 to 61 micrograms Hg/L (Table 1). When a portion of each waste sample was allowed to run through a column of polyacrylate adsorbent resin without oxidative pretreatment, the mercury concentration of the column effluent was between 3 and 4 micrograms/L. When a second portion of each wastewater sample was subjected to a hypochlorite oxidation pretreatment and then exposed to the adsorbent resin column, the final mercury concentration of the column effluent was between 0.5 and 0.8 micrograms/L.

Example 4

Wastewater from clinical laboratories typically combines wastewaters derived from a variety of different medical and/or biotechnical tests and procedures. The combined clinical wastewater contains mercury and a variety of other metals. To determine whether the procedure is effective at mercury removal in the presence of other dissolved metals, samples of combined clinical lab wastes were obtained. The mercury concentrations in these wastewaters ranged from 2.3 to 7.4 micrograms/L (Table 1). A portion of each wastewater sample was then allowed to run through a column of polyacrylate adsorbent resin without oxidative pretreatment. The mercury concentration of the column effluent was consistently determined to be greater than 1 microgram/L. When a second portion of each wastewater was subjected to a hypochlorite oxidation pretreatment and then exposed to the adsorbent resin column, the final mercury concentration of the column effluent was reproducibly 0.8 micrograms/L.

Example 5

A series of samples of contaminated groundwaters having mercury concentrations of between 11.2 and 11.4 micrograms/L were obtained (Table 2).

TABLE 2

Removal of Mercury From Contaminated Groundwater Using Hypochlorite Oxidation and Treatment with Adsorbent Resin.

| | CONCENTRATION | micrograms/L |
|---|---|---|
| TRIAL | MERCURY Untreated Wastewater | Wastewater After Oxidation | Wastewater After Oxidation & Adsorption |
| 1 | 11.32 | 15.27 | 0.152 |
| 2 | 11.21 | 15.2 | 0.022 |
| 3 | 11.36 | 15.51 | 0.046 |
| 4 | 11.24 | 15.23 | 0.008 |

Each sample was then subjected to hypochlorite oxidation, and the mercury concentration of the oxidized wastewaters was then determined In each sample, oxidation alone caused an increase in the detected concentration of mercury of about 4 micrograms/L. When the oxidized sample was exposed to the column of adsorbent resin, the mercury concentration was reduced to 0.2 micrograms/L or less, allowing the purified groundwater to be returned to the environment.

Example 6

A full-scale system was set up to treat mercury-laden water from a wet scrubber used to treat flue gas from a 1000 lb/burn medical waste incinerator. The mercury concentration of this wastewater varies from 470 micrograms/L to 13,600 micrograms/L. First, the wastewater from the incinerator was directed through a series of four 1.2 gallon polyacrylate resin adsorbent columns (flow rate of 1.25 gallons/min) with no oxidative pretreatment. When the mercury concentration in the effluent from these columns is determined on several different dates, it is found that the mercury concentration is consistently higher than 10 micrograms/L; indeed, on two occasions, the mercury concentration is higher than 200 micrograms/L (Table 3).

TABLE 3

Incinerator Scrubber Water.

| DATE | SOURCE | FEED (ug/L) | EFFLUENT (ug/L) | REMOVAL |
|---|---|---|---|---|
| 10/23/96 | no oxidation | 1433 | 44.8 | 96.8737% |
|  | oxidation | 2736 | 0.9 | 99.9671% |
| 10/30/96 | no oxidation | 9844 | 208.3 | 97.8840% |
|  | oxidation | 10600 | 0.6 | 99.9943% |
| 11/06/97 | no oxidation | 471 | 229.1 | 51.3588% |
|  | oxidation | 1127 | 0.4 | 99.9645% |
| 11/13/96 | no oxidation | 13610 | 97.3 | 99.2851% |
|  | oxidation | 12490 | 0.5 | 99.9960% |
| 11/20/96 | no oxidation | 1369 | 33.9 | 97.5237% |
|  | oxidation | 1461 | 0.3 | 99.9795% |
| 12/04/96 | no oxidation | 1337 | 25.6 | 98.0853% |
|  | oxidation | 1461 | 0.4 | 99.9726% |
| 12/11/96 | no oxidation | 2560 | 24.8 | 99.0313% |
|  | oxidation | 3024 | 0.8 | 99.9735% |
| 12/17/96 | no oxidation | 2890 | 11.2 | 99.6125% |
|  | oxidation | 2731 | 0.3 | 99.9890% |
| 01/08/97 | no oxidation | 5840 | 22.2 | 99.6199% |
|  | oxidation | 4970 | 0.2 | 99.9960% |
| 01/22/97 | no oxidation | 1220 | 45.0 | 96.3115% |
|  | oxidation | 1320 | 0.2 | 99.9848% |
| 03/26/97 | no oxidation | 1410 | 31.7 | 97.7518% |
|  | oxidation | 1800 | 0.5 | 99.9722% |
| 04/02/97 | no oxidation | 1860 | 67.9 | 96.3495% |
|  | oxidation | 1731 | 0.2 | 99.9884% |
| 04/09/97 | no oxidation | 1860 | 61.0 | 96.7204% |
|  | oxidation | 2189 | 0.5 | 99.9772% |

Wastewaters from the incinerator were then subjected to an oxidative pretreatment followed by exposure to an adsorbent resin (Table 3). The wastewaters from the reactor were first sent to a 300 gallon reaction vessel where they were treated with a hypochlorite oxidizing agent. Then, they were directed through a series of adsorbent resin columns, exactly as described above. When the effluent from the columns is determined, it is found that a combination of oxidation and mercury-selective adsorption reproducibly removes greater than 99.96% of the mercury from the wastewater. More importantly, the mercury concentration of the effluent waters is consistently below 1 microgram/L, allowing it to be discharged directly into the environment.

As shown the preceding examples, if aqueous mercuric chloride solution is treated with the oxidizing agent hypochlorite prior to flowing through the column of adsorbent resin in the same manner as before, little or no change is seen in the mercury concentration of the column effluent. However, if the wastewaters encountered in the real world are oxidized with hypochlorite prior to exposure to the adsorbent, the mercury concentration in the column effluent is reduced substantially (Examples 2, 3, 4, and 6). As shown in example 5, hypochlorite oxidation appears to release tightly bound or complexed mercury into solution as free mercury which can then be adsorbed by the adsorbent resin. The final effluent mercury concentration after oxidation and exposure to adsorbent resin is usually low enough to be either used in an industrial process or discharged into the environment without further treatment.

What is claimed is:

1. A method of removing mercury from water containing at least elemental and complexed mercury-containing contaminants, comprising the steps of:
   (a) treating said water with an excess amount of an oxidizing agent to generate free mercury ions from elemental and complexed mercury to produce pretreated water; and
   (b) treating the pretreated water with a mercury-selective adsorbent material.

2. The method of claim 1, further comprising the steps of:
   (c) determining the concentration of mercury-containing contaminants in the pretreated water subsequent to treatment with the adsorbent material;
   (d) discharging the pretreated water if the concentration of mercury-containing contaminants determined in step (c) is below a desired value; and
   (e) further treating the pretreated water if the concentration of mercury-containing contaminants determined in step (c) is above a predetermined value.

3. The method of claim 1, wherein the water containing mercury-containing contaminants is treated with said excess of an oxidizing agent at a temperature between 60° F. and 90° F.

4. The method of claim 1, wherein water containing said mercury-containing contaminants is treated with said excess of said oxidizing agent for a period of time from 5 minutes to 60 minutes.

5. The method of claim 4, wherein water containing mercury-containing contaminants is treated with said excess of said oxidizing agent for a period of time of from 5 minutes to 30 minutes.

6. The method of claim 1, wherein water containing mercury-containing contaminants is treated with said excess of said oxidizing agent for a period of time of from 5 minutes to 15 minutes.

7. The method of claim 1, wherein treatment of the pretreated water with mercury-selective adsorbent material is by causing the pretreated water to flow through a porous bed of adsorbent material.

8. The method of claim 1, wherein treatment of the pretreated water with mercury-selective adsorbent material is by introducing the pretreated water into a vessel containing the adsorbent material.

9. The method of claim 8, wherein the pretreated water contacts the adsorbent material for a period of time from 5 minutes to 30 minutes.

10. The method of claim 9, wherein the oxidizing agent is selected from the group consisting of hypochlorite, hydrogen peroxide, Fenton's reagent ozone, and combinations thereof.

11. The method of claim 1, wherein the excess amount of oxidizing agent leaves unreacted oxidizing agent in the water.

12. The method of claim 1, wherein the oxidizing agent is selected from the group consisting of hypochlorite, hydrogen peroxide, Fenton's reagent, ozone, and combinations thereof.

13. The method of claim 1, wherein the oxidizing agent is hypochlorite.

14. The method of claim 1, wherein the mercury adsorbent material is a porous resin having immobilized mercury-selective adsorbing groups bound thereto.

15. The method of claim 14, wherein the porous resin is selected from the group consisting of a styrene resin, an acrylic resin, a polysaccharide resin, and combinations thereof.

16. The method of claim 15, wherein the porous resin is crosslinked with a polyfunctional crosslinking agent.

17. The method of claim 14, wherein the adsorbing groups have an equilibrium binding constant for mercury ions to achieve substantially complete binding of the mercury ions, and wherein the adsorbing groups are resistant to oxidation.

18. The method of claim 14, wherein the adsorbing groups are selected from the group consisting of dithiocarbamate groups, thiophene groups, thioether groups, thiazole groups, thiocyanine groups, thiol groups, thourenium groups, amino groups, polyethylene imine groups, derivatives thereof, and combinations thereof.

19. The method of claim 14, wherein the adsorbent material is a crosslinked styrene-divinylbenzene copolymer having immobilized dithiocarbamate groups bound thereto.

20. The method of claim 14, wherein the adsorbent material is a macroporous polyacrylic resin having immobilized dithiocarbamate groups bound thereto.

21. The method of claim 1, wherein the adsorbent material is an inorganic matrix selected from the group consisting of silica, alumina, titania, clays, zeolites, and zirconia, said inorganic matrix having immobilized mercury-selective groups bound thereto.

22. The method of claim 21, wherein said immobilized mercury-selective adsorbing groups are resistant to oxidation.

23. The method of claim 21, wherein the mercury-selective adsorbing groups are selected from the group consisting of dithiocarbamate groups, thiophene groups, thioether groups, thiazole groups, thiocyanine groups, thiol groups, thiourenium groups, amino groups, polyethylene imine groups, derivative thereof, and combinations thereof.

24. A method of disposing of water containing at least elemental and complexed mercury-containing contaminants, comprising the steps of:
  (a) treating said water with an excess amount of an oxidizing agent to generate free mercury ions from elemental and complexed mercury to produce pretreated water;
  (b) removing an effluent stream of pretreated water;
  (c) passing the effluent stream of pretreated water through a mercury-selective adsorbent material to produce an effluent stream of water having a reduced mercury content; and
  (d) discharging the effluent stream of water having a reduced mercury content to a disposal site.

25. The method of claim 24, wherein the adsorbent material is a porous resin having immobilized mercury-selective chelating groups bound thereto.

26. The method of claim 24, wherein the adsorbent material is a crosslinked styrene-divinylbenzene copolymer having immobilized dithiocarbamate groups bound thereto.

27. The method of claim 24, wherein the oxidizing agent is selected from the group consisting of hypochlorite, hypobromite, iodinates, chlorine dioxide, brominating agents, hydrogen peroxide, Fenton's reagent, and ozone.

28. A method of disposing water containing at least elemental and complexed mercury-containing contaminants, comprising the steps of:
  a) treating said water with an excess of an oxidizing agent to generate free mercury ions from elemental and complexed mercury to produce pretreated water;
  b) treating the pretreated water with an amount of a mild reducing agent sufficient to neutralize substantially all unreacted oxidizing agent present in the pretreated water;
  c) passing the pretreated water from step (b) through a column of mercury-selective adsorbent material to produce an effluent stream of water having a reduced mercury content;
  d) determining a concentration of said mercury-containing contaminants in the effluent stream of water having a reduced mercury content;
  e) discharging the effluent stream of water having a reduced mercury content to a disposal site if the concentration of mercury-containing contaminants in the effluent stream of water is below a predetermined level; and
  f) returning the effluent stream of water having a reduced mercury content to the reaction chamber of step (a) for further treatment if theconcentration of mercury-containing contaminants in the effluent stream of water is above the predetermined level.

29. A method of disposing water containing at least elemental and complexed mercury-containing contaminants, comprising the steps of:
  a) treating said water with an excess of an oxidizing agent to generate free mercury ions from elemental and complexed mercury to produce pretreated water;
  b) treating the pretreated water with an amount of a mild reducing agent sufficient to neutralize substantially all unreacted oxidizing agent present in the pretreated water;
  c) passing the pretreated water into a vessel containing a mercury-selective adsorbent material;
  d) withdrawing an effluent stream of water having a reduced mercury content from the vessel;
  e) determining a concentration of mercury-containing contaminants in the effluent stream of water having a reduced mercury content;
  f) discharging the effluent stream of said water having a reduced mercury content to a disposal site if the concentration of mercury-containing contaminants in the effluent stream of water is below a predetermined level; and
  g) returning the effluent stream of water having a reduced mercury content for further treatment if the concentration of mercury-containing contaminants in the effluent stream of water is above the predetermined level.

30. A method of removing mercury from water containing at least elemental and complexed mercury-containing contaminants, comprising the steps of:
  (a) treating said water with an excess amount of an oxidizing agent at a temperature between 60° F. and 90° F. to generate free mercury ions from elemental and complexed mercury to produce pretreated water; and
  (b) treating the pretreated water with a mercury-selective adsorbent material.

31. A method of removing mercury from water containing at least elemental and complexed mercury-containing contaminants, comprising the steps of:
  (a) treating said water with an excess amount of an oxidizing agent to generate free mercury ions from elemental and complexed mercury to produce pretreated water; and (b) treating the pretreated water with a mercury-selective adsorbent material to produce water containing less than 1 ppb mercury.

32. A method of removing mercury from water containing at least elemental and complexed mercury-containing contaminants, comprising the steps of:

(a) treating said water with an excess amount of an oxidizing agent for a time between 5 minutes and 30 minutes to generate free mercury ions from elemental and complexed mercury to produce pretreated water; and (b) treating the pretreated water with a mercury-selective adsorbent material.

33. A method of removing mercury from water containing at least elemental and complexed mercury-containing contaminants, comprising the steps of:

(a) treating said water with an excess amount of an oxidizing agent to generate free mercury ions from elemental and complexed mercury to produce pretreated water;

b) treating the pretreated water with an amount of a mild reducing agent sufficient to neutralize substantially all unreacted oxidizing agent present in the pretreated water; and (c) treating the pretreated water with a mercury-selective adsorbent material.

34. A method of removing mercury from water containing at least elemental and complexed mercury-containing contaminants, comprising the steps of:

(a) treating said water with an excess amount of an oxidizing agent sufficiently strong to oxidize elemental mercury to ionic mercury and release complexed mercury ions into solution as a non-complexed ionic form to produce pretreated water; and (b) treating the pretreated water with a mercury-selective adsorbent material.

35. A method of removing mercury from water containing at least elemental and complexed mercury-containing contaminants, comprising the steps of:

(a) treating said water with an excess amount of an oxidizing agent to oxidize elemental mercury and release complexed mercury thereby producing pretreated water containing free mercury ions; and (b) treating the pretreated water with a mercury-selective adsorbent material to remove said ions.

* * * * *